United States Patent [19]

Kazato

[11] Patent Number: 5,297,149
[45] Date of Patent: Mar. 22, 1994

[54] EMERGENCY CIRCUIT FOR, E.G., NUMERICAL CONTROL UNIT

[75] Inventor: Hirohiko Kazato, Aichi, Japan

[73] Assignee: Mitsubishi Denki Kabushiki Kaisha, Tokyo, Japan

[21] Appl. No.: 653,201

[22] Filed: Jan. 23, 1991

[30] Foreign Application Priority Data

Jun. 6, 1990 [JP] Japan .................................. 2-146176

[51] Int. Cl.$^5$ .............................................. G06F 11/00
[52] U.S. Cl. ...................................... 371/14; 371/15.1
[58] Field of Search ...................... 371/14, 12, 15, 19, 371/20, 61, 62, 29

[56] References Cited

U.S. PATENT DOCUMENTS

| | | | |
|---|---|---|---|
| 4,435,698 | 3/1984 | Klett | 340/870.19 X |
| 4,521,884 | 6/1985 | Dix et al. | 371/15.1 |
| 4,616,335 | 10/1986 | Howe, Jr. et al. | 371/14 X |
| 4,795,921 | 1/1989 | Kato | 371/14 X |
| 4,916,697 | 4/1990 | Roche et al. | 371/14 |

FOREIGN PATENT DOCUMENTS

| | | |
|---|---|---|
| 0066737 | 12/1982 | European Pat. Off. . |
| 0336973 | 10/1989 | European Pat. Off. . |
| 1124133 | 2/1962 | Fed. Rep. of Germany . |
| 1-297974 | 12/1989 | Japan . |

*Primary Examiner*—Robert W. Beausoliel, Jr.
*Assistant Examiner*—Glenn Snyder
*Attorney, Agent, or Firm*—Sughrue, Mion, Zinn, Macpeak & Seas

[57] ABSTRACT

A fault detection/alarm system includes an oscillator at one end of a signal cable whose clock output is OR'ed with a fault detection signal. A receiving unit receives the OR'ed signal and detects the leading edge of the clock. If the clock signal disappears due to breakage of the signal cable, the appearance of a fault detection signal or other reason, the leading edges are no longer detected, causing the raising of a fault signal which may be an emergency stop signal for the receiving unit.

11 Claims, 3 Drawing Sheets

OSCILLATOR (11) OUTPUT
  FAULT DETECTION CIRCUIT (2) OUTPUT
  OR CIRCUIT (12) OUTPUT
  EDGE DETECTION CIRCUIT (13) OUTPUT
  PRIMARY DELAY CIRCUIT (14) OUTPUT
  INVERTING CIRCUIT (15) OUTPUT
EMERGENCY STOP CIRCUIT (6) INPUT
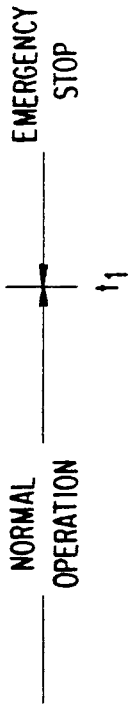
NORMAL OPERATION | $t_1$ | EMERGENCY STOP
TIME →

EMERGENCY CIRCUIT FOR, E.G., NUMERICAL CONTROL UNIT

BACKGROUND OF THE INVENTION

The present invention relates to a device for use in a fault detection or alarm system, which is capable of reliably performing fault detection or emergency action such as the stoppage of a controlled device, despite loss of electrical communication or other problems. In one exemplitive embodiment, the invention is applied to a numerically controlled machine tool.

To efficiently control a multi-axis machine tool, etc., a numerical control unit includes a numerical operation section and a plurality of servo amplifiers provided for individual axes, which are connected by a signal cable. Signals transferred through this signal cable include command signals and emergency stop signals from the numerical operation section to the servo amplifiers, feedback signals from the servo amplifiers to the numerical operation section, and signals concerned with diagnostics and servo control adjustments.

FIG. 3 is a block circuit diagram of a known emergency stop device for a numerical control unit and associated machine tool and FIG. 4 is a timing chart for the circuit diagram shown in FIG. 3.

Referring to FIG. 3, the numeral 1 indicates a numerical operation section. At 2 is a fault detection circuit provided in the numerical operation section 1. An emergency stop signal cable 3 is connected to the fault detection circuit 2, and servo amplifiers 4A to 4C are connected to the emergency stop signal cable 3. Pull-up resistors 5 are provided in the servo amplifiers 4A to 4C and connected to the emergency stop signal cable 3. Emergency stop circuits 6 are provided in each servo amplifier.

In the prior art emergency stop system, applied to a numerical control unit configured as described above, the fault detection circuit 2 in the numerical operation section 1 detects an emergency stop input from outside the numerical control unit in addition to internal faults within the unit. The fault detection circuit 2 transmits a "low" signal to the emergency stop signal cable 3 when the operation is normal, and a "high" signal upon detection of any fault.

When the signal transmitted through the emergency stop signal cable 3 is "low" the emergency stop circuits 6 place the servo amplifiers 4A to 4C in a normal operation state as shown in FIG. 4. When said signal goes "high" at time t1, the emergency stop circuits 6 put the servo amplifiers 4A to 4C into an emergency stop state. That is, either the input of an external emergency stop command or the detection of a fault within the unit results in an emergency stop state.

Breakage of the emergency stop signal cable 3 itself is one of the failures which may occur. In this case, the pull-up resistor 5 switches the input to the emergency stop circuit 6 to "high" to enter the emergency stop state, thereby ensuring fail-safe operation.

The known circuit is designed to detect a signal transmitted from a fault detection circuit 2 over an emergency stop signal cable 3. Therefore, when the emergency stop signal is made "low" due to the accidental contact of the emergency stop signal cable 3 with a common or ground point or the like, or when there is a faulty circuit in any of the servo amplifiers 4A to 4C, the emergency stop state cannot be entered if an attempt is made to effect an emergency stop from the numerical operation section 1, and thus fail-safe operation cannot be achieved.

SUMMARY OF THE INVENTION

It is accordingly, an object of the present invention to overcome the disadvantages in the prior art by providing a circuit which allows an emergency stop function to operate on a fail-safe basis even if a fault occurs in the emergency stop signal cable or in any of the controlled units.

DETAILED DESCRIPTION OF THE PREFERRED EMBODIMENTS

Figure 1:
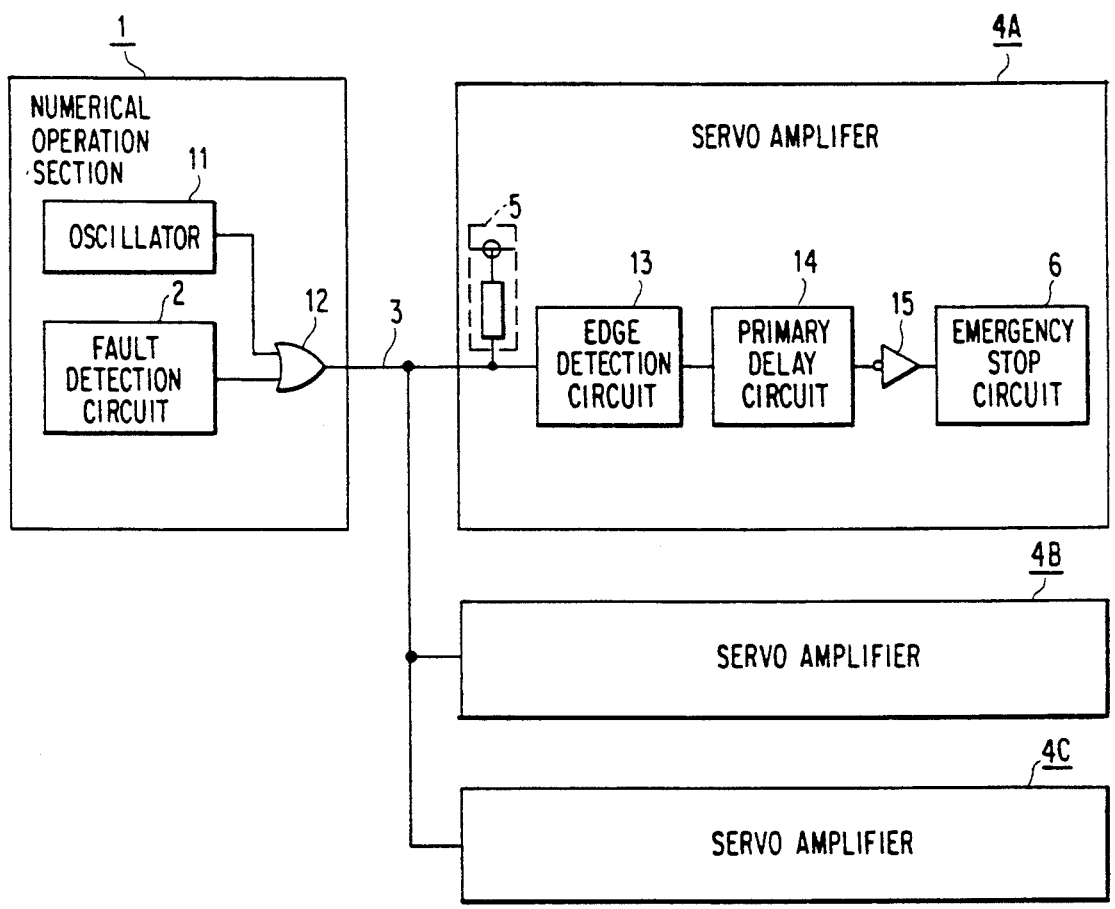
FIG. 1 is a block diagram of an embodiment of an emergency stop control circuit according to the present invention.

FIG. 1 is a block diagram of an embodiment of the present invention and FIG. 2 is a timing chart therefor, wherein parts similar to those in the prior art circuit are designated by the same reference characters.

In FIGS. 1 and 2, the numeral 11 indicates an oscillator. An OR circuit 12 is connected to the oscillator 11 and to fault detection circuit 2. Collectively these units constitute a signal detection circuit, the output side of which is connected to the emergency stop signal cable 3. An edge detection circuit 13 is connected to the emergency stop signal cable 3 for generating a pulse upon receipt of the leading edge of an input signal. A primary delay circuit 14 is connected to the edge detection circuit 13, and an inverting circuit 15 is connected to the primary delay circuit 14, the output side of which is connected to the emergency stop circuit 6. The edge detection circuit 13, primary delay circuit 14 and inverting circuit 15 constitute a signal determination circuit.

The operation of the present embodiment will now be described with reference to FIG. 2.

Figure 2A:
FIGS. 2(a)-(f) is a timing chart for the circuit diagram shown in FIG. 1.

As shown in FIG. 2a, the oscillator 11 continuously outputs a clock signal at predetermined intervals, whether during normal operation or at an emergency stop.

Figure 2B:
Figure 2C:
Figure 2D:
Figure 2E:
Figure 2F:
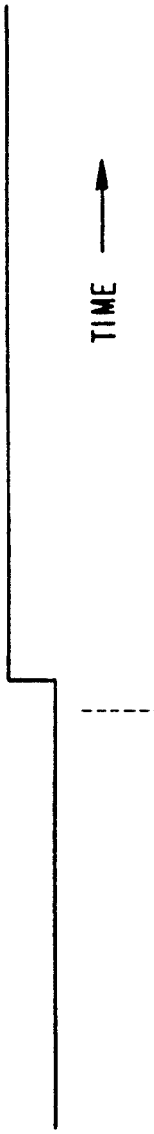
Figure 3:
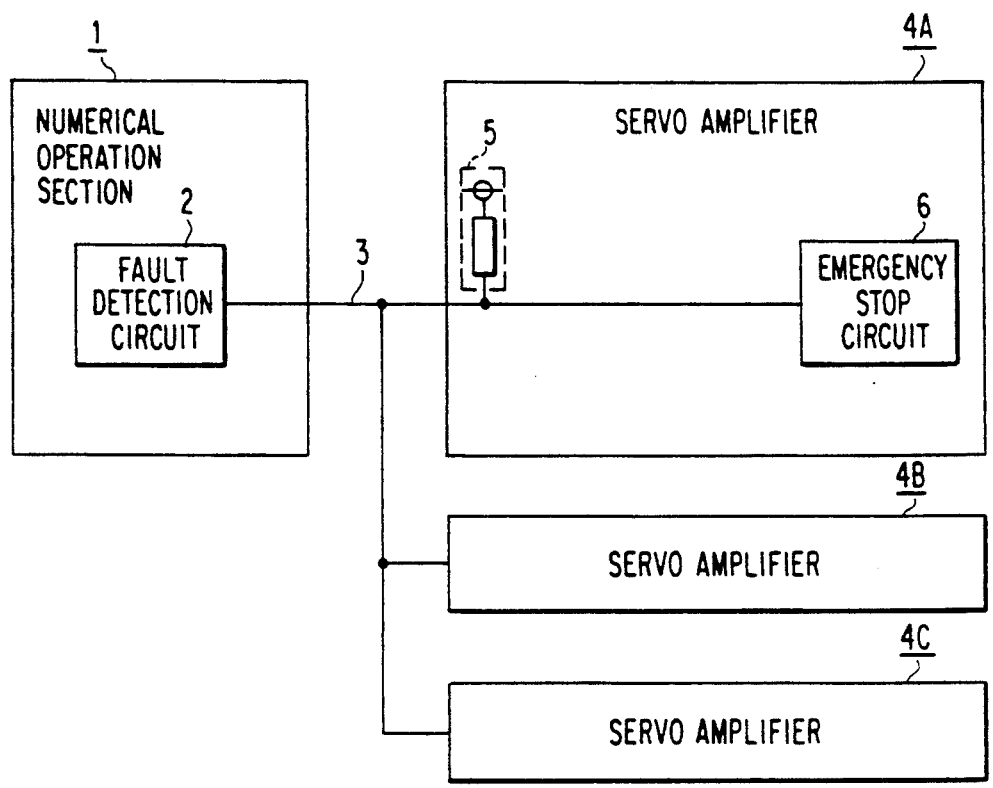
FIG. 3 is a block diagram of a prior art emergency stop circuit as applied to a numerical control unit.
Figure 4:
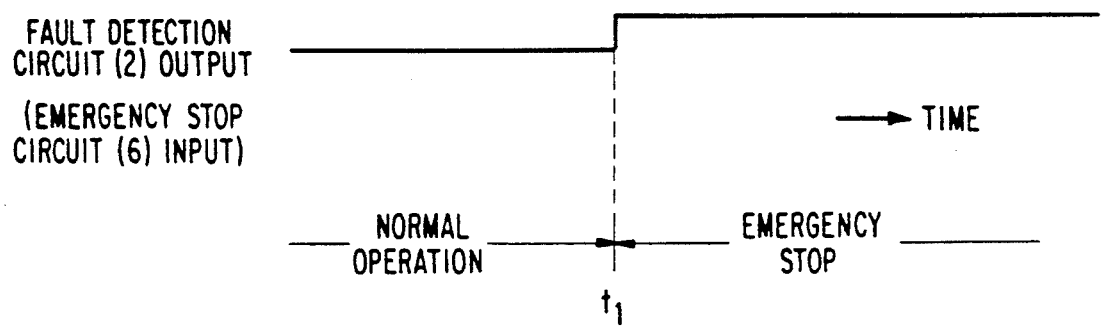
FIG. 4 is a timing chart for the circuit diagram illustrated in FIG. 3.

During normal operation, since the output of the fault detection circuit 2 is "low" as shown in FIG. 2b, the output of the OR circuit 12 is a clock signal as shown in FIG. 2c. This signal is input to the edge detection circuit 13 through the emergency stop signal cable 3. The edge detection circuit 13 outputs a pulse as shown in FIG. 2d in accordance with the leading edge of the input signal. The primary delay circuit 14 outputs that pulse input with an appropriate time constant, and if there is a pulse input, keeps the output "high". This signal is inverted by the inverting circuit 15 and its output, i.e. the input of the emergency stop circuit 6, is set "low" as shown in FIG. 2f to cancel the emergency stop.

When a fault occurs at time t1, the output of the fault detection circuit 2 is switched "high" and the output of the OR circuit 12 also goes "high". This signal is entered into the edge detection circuit 13. However, since the input has no repetitive leading edge, the output of the edge detection circuit 13 goes "low". The output of the primary delay circuit 14 goes from "high" to "low", and the input of the emergency stop circuit 6 is set "high" at the input threshold level of the inverting circuit 15, effecting an emergency stop.

If a fault occurs in either of the emergency stop signal cable 3 or any of the servo amplifiers 4A to 4C and the emergency stop signal transmitted from the emergency stop signal-cable 3 is set either "high" or "low", the output of the edge detection circuit 13 is switched "low" because neither input has a repetitive leading edge, and the input of the emergency stop circuit 6 is thus set "high", to make an emergency stop as described above.

The OR circuit 12 employed as a signal detection circuit for synthesizing the emergency stop signal in the above embodiment may be replaced by a switch or a gate which has a similar function.

In addition, the edge detection circuit 13, primary delay circuit 14 and inverting circuit 15 used as a signal determination circuit for determining the presence or absence of the clock signal may be replaced by a retriggerable stable multivibrator or the like to provide a similar facility.

Further, the unbalanced connection type circuit for generating the emergency stop signal may be of a balanced type.

Furthermore, the present embodiment is applicable not only to the transmission of an electrical signal through the emergency stop signal cable 3 but also to detection using an optical signal. In the case of optical circuits, the determination made depending on whether the clock signal is present or absent is extremely significant.

It will be apparent that the invention, as described above, achieves an emergency fault detection/alarm circuit which interprets a transmitted signal to be an emergency stop signal when the signal transmitted does not include a clock signal. Therefore, when maintained "high" or "low" due to a signal cable or controlled element fault, the signal is interpreted as an emergency stop signal, allowing the emergency stop function to operate on a fail-safe basis.

What is claimed is:

1. A fault detection or alarm system for use with multiple units which are connected by a signal cable, comprising:
   an oscillator provided in a first unit for generating a clock signal;
   a fault detection circuit for detecting faults in said units;
   a signal transmission circuit, directly connected to said fault detection circuit and between said oscillator and said signal cable, for transmitting said clock signal to said signal cable only while receiving an output from said fault detection circuit indicating that a fault has not been detected; and
   signal determination circuit means, provided in at least one second unit, for receiving transmitted signals from said signal cable and for determining that a fault has occurred based on an absence of the clock signal from said transmitted signal.

2. A system as claimed in claim 1, wherein said signal determination circuit means includes an edge detection circuit for generating a pulse in response to a leading edge of each pulse in said clock signal in said transmitted signal.

3. A system as claimed in claim 2, wherein said signal determination circuit means further includes a delay circuit, coupled to said edge detection circuit, for outputting a pulse having a predetermined time constant for each pulse from said edge detection circuit means, and inverter means, coupled to said delay circuit for inverting an output from the delay circuit, said delay circuit and inverting means operating to output a signal having a first level representing a no fault condition while receiving pulses from said edge detection circuit.

4. A system as claimed in claim 1, wherein said signal determination circuit means comprises:
   a retriggerable stable multivibrator circuit for producing an output having a first level, representing a no fault condition, only while said multivibrator circuit detects clock signal pulses in said transmitted signal.

5. A system as claimed in claim 1, said signal determination circuit means further including an emergency stop circuit for stopping an operation of said at least one second unit, said emergency stop circuit being coupled to an output of said signal determination circuit means.

6. A system as claimed in claim 1, wherein said first unit comprises a control unit for said at least one second unit.

7. A system as claimed in claim 6, wherein said first unit comprises a numerical control unit and said at least one second unit comprises at least one servo amplifier.

8. A system as claimed in claim 1, wherein said signal transmission circuit includes an OR gate that OR's said clock signal and said output of said fault detection circuit, thereby producing and outputting said transmitted signal.

9. A system as claimed in claim 1, said signal determination circuit means further including an emergency stop circuit for stopping an operation of said at least one second unit, said emergency stop circuit being coupled to an output of said signal determination circuit means.

10. A system as claimed in claim 1, wherein said signal determination circuit means identifies that a fault condition has occurred even when a fault occurs in said signal cable, causing said signal cable to transmit one constant signal level.

11. A fault detection or alarm system, comprising:
   a first unit containing detection means for generating a clock signal only when no faults are detected in said system;
   at least one second unit including determination means for receiving said clock signal and for generating a fault signal in response to an absence of said clock signal; and
   means for exercising control over said at least one second unit upon receipt of said fault signal,
   wherein said determination means includes an edge detection circuit for generating a pulse in response to a leading edge of each pulse in said clock signal received by said determination means, and
   wherein said determination means includes a delay circuit, coupled to said edge detection circuit, for outputting a pulse having a predetermined time constant for each pulse received from said edge detection circuit, and inverter means, coupled to said delay circuit for inverting an output from the delay circuit, said delay circuit and inverting means operating to output a signal having a first level representing a no fault condition while receiving pulses from said edge detection circuit.

* * * * *